United States Patent

[11] 3,601,313

[72] Inventor T. G. Owe Berg
 14361 Deanann Place, Garden Grove, Calif. 92640
[21] Appl. No. 833,993
[22] Filed June 17, 1969
[45] Patented Aug. 24, 1971

[54] METHOD AND MEANS FOR THE REMOVAL OF LIQUID OR SOLID PARTICLES FROM A VOLUME OF GAS
 14 Claims, 1 Drawing Fig.
[52] U.S. Cl. .................................................. 239/2, 55/107, 239/3, 239/15
[51] Int. Cl. .................................................. A01g 15/00
[50] Field of Search .................................. 239/2, 3, 15; 55/107, 113; 209/127; 46/8; 15/50; 310/6; 117/93

[56] References Cited
UNITED STATES PATENTS
1,284,982 11/1918 Balsillie .......................... 239/2 X
2,452,794 11/1948 Saachy ........................... 46/8 UX
2,933,414 4/1960 Beck .............................. 117/93
3,028,685 4/1962 Silverman ....................... 310/6 UX
3,333,288 8/1967 Ziegler ........................... 15/50 R Primary Examiner—M. Henson Wood, Jr.
Assistant Examiner—Thomas C. Culp, Jr.
Attorney—Hinderstein and Silber ABSTRACT: There is disclosed a method for the removal of liquid or solid particles from a volume of gas by generating a multiplicity of charged, individual bubbles, the bubbles being substantially larger than the particles, and introducing the charged bubbles into the volume of gas. The bubbles are either hollow liquid bodies or hollow solid bodies. Means are also disclosed for generating and electrically charging bubbles. According to a first embodiment of the invention, the particles are fog droplets and the method and means are used to disperse the fog. According to a second embodiment, the particles are dust particles which exist in the atmosphere, and the method and means are used to collect and remove the dust. According to a third embodiment, the method and means are used to clean dust particles from effluent gases such as those resulting from combustion processes. According to a fourth embodiment, the method and means may be used to collect particles during chemical manufacturing processes.

PATENTED AUG24 1971 3,601,313
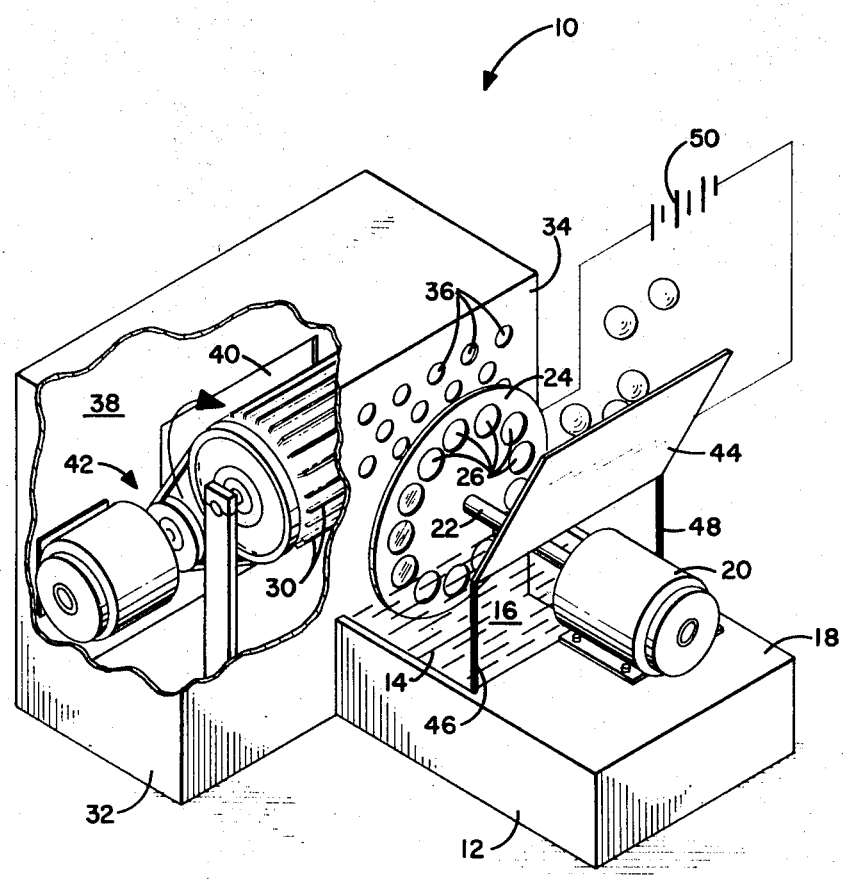
INVENTOR.
T. G. OWE BERG
BY
ATTORNEYS

METHOD AND MEANS FOR THE REMOVAL OF LIQUID OR SOLID PARTICLES FROM A VOLUME OF GAS

BACKGROUND OF THE INVENTION

1. Field of the Invention

The present invention relates to a method and means for the removal of liquid or solid particles from a volume of gas and more particularly, to a method which utilizes charged, individual bubbles to attract and remove liquid or solid particles from a volume of gas.

2. Description of the Prior Art

Many situations exist in which it is desirable to be able to remove liquid or solid particles from a volume of gas in which they are suspended. For example, removal of solid particles in the form of dust may be required in mining operations, such as coal mining, wherein very small coal particles represent a serious health hazard. Removal of liquid or solid particles may also be required in chemical manufacturing processes in which an undesirable mist often forms. The ability to remove liquid particles would be invaluable in the dispersal of fog which is caused by the suspension of a plurality of droplets of liquid in the atmosphere. Finally, many situations exist in which it is necessary to physically separate and remove dust particles from effluent gases in which they are suspended. As examples, such separation may be required: (1) to collect a product which has been processed or handled in gas suspension, as in spray-drying or pneumatic conveying; (2) to recover a valuable product inadvertently mixed with processing gases, as in kiln or smelter exhausts; (3) to eliminate a nuisance, as in fly-ash removal; (4) to reduce equipment maintenance, as in engine intake air filters; (5) to eliminate a health, fire, explosion or safety hazard, as in bagging operations or nuclear separations plant ventilation air; and (6) to improve product quality, as in cleaning of air used in processing pharmaceutical or photographic products.

Many particle collection systems have been developed for separating and removing particles from a volume of gas. Generally, most systems existing today depend upon subjecting the suspended particles to some force which will drive them to a collecting surface or surfaces. However, although many of the examples cited above are suited for such removal techniques, many other situations are not. For example, conventional particle collection systems are ineffective in the dispersal of fog which is nothing more than water droplets suspended in the atmosphere. Because of the large volume of air involved, conventional particle collection systems are incapable of dealing with the problem.

Another example is in mining operations and especially in coal mining where it would be desirable to be able to remove the coal dust from the atmosphere without first removing the atmosphere from the room, processing the atmosphere, and returning it. For this reason, some attempts have been made to clean the coal mine atmosphere by spraying water into the coal mine. This technique relies on the known theory that falling droplets of water are scavengers of dust particles. Improved results have been obtained by placing a charge on the water droplets since the charge increases the collection efficiency of the droplets. However, this technique has not been very effective because of the great relative velocity of a spray drop that is large enough to carry a substantial charge. Although the particles to be scavenged may be attracted to the spray drop and accelerated to a velocity far above that in free fall, they are not likely to reach a large enough velocity to catch up with the falling spray drop. If the scavenger were large enough to carry a large charge and at the same time had a small fall velocity, it would be much more effective as a scavenger.

The use of spray drops in spray towers and scrubbers is based upon collection by impaction as a result of inertia. As a consequence, increased collection efficiency is sought by increasing the drop velocity. However, very small particles, of less than $1\mu$, virtually lack inertia and cannot be scavenged in this manner. The collection efficiency of conventional equipment based on this principle is very poor for small particles.

The general principles outlined above are known. For example, it is known that hailstones and snowflakes are more effective scavengers of atmospheric particulates than are rain drops. The invention pertains to the generalization and the utilization of these principles for practical purposes. SUMMARY OF THE INVENTION The present invention overcomes the deficiencies of present methods for the removal of liquid and solid particles from a volume of gas. It hereby produces a collection efficiency that exceeds that of conventional methods by orders of magnitude.

The present invention is based upon a combination of two principles: electrostatic attraction by the scavenger of the particles to be scavenged, and a small relative fall velocity of the scavenger combined with a large size and a large charge. The application of these principles leads to the use of bubbles as scavengers. They offer the additional advantage that their fall, or rise, velocity can be controlled, e.g. by a choice of gas or gas temperature inside the bubble.

Therefore, and in accordance with the present invention, liquid or solid particles may be removed from a volume of gas in which they are suspended by generating a multiplicity of bubbles, the bubbles being substantially larger than the particles, and introducing the bubbles into the volume of gas.

It is, therefore, an object of the present invention to provide a method for the removal of liquid or solid particles from a volume of gas.

It is a further object of the present invention to provide a method for the dispersal of fog.

It is a still further object of the present invention to provide a method for the removal of dust particles from a volume of gas.

It is another object of the present invention to provide a method for the removal of coal particles from a coal mine.

It is still another object of the present invention to provide a method for collection of liquid and solid particles during the manufacture of chemical elements, compounds and solutions.

Another object of the present invention is the provision of means for generating electrically charged bubbles.

Still another object of the present invention is the provision of a method for the removal of liquid or solid particles from a volume of gas by generating a multiplicity of charged, hollow, liquid or solid bubbles and introducing the bubbles into the volume of gas.

Still other objects, features and attendant advantages of the present invention will become apparent to those skilled in the art from a reading of the following detailed description of the preferred embodiments, taken in conjunction with the accompanying drawings wherein:

BRIEF DESCRIPTION OF THE DRAWINGS

The sole FIGURE shows a machine for the production of bubbles to which a charging device has been added.

DESCRIPTION OF THE PREFERRED EMBODIMENTS

Before proceeding with a discussion of the specific embodiments of the present invention, it should be mentioned that techniques for blowing bubbles per se are old and well known in the art. Many different types of liquids and gases may be used to generate bubbles depending upon the stability required. For discussion of the various possible liquids and gases available for bubbles and a discussion of the historical development of experiments with bubbles, reference should be had to an article entitled "How to Blow Soap Bubbles That Last for Months or Even Years" by C. L. Strong in Scientific American, May, 1969, Volume 220, No. 5, pages 128–134. It should also be mentioned that when using the word "bubble" there is not only included the ordinary hollow liquid bodies made from soap or some other liquid solution, but there is also included hollow, solid bodies such as hollow spheres made from plastic, glass, or other materials, since in both cases, the results will be the same.

Referring now to the sole FIGURE of drawings, there is shown a conventional bubble generator, generally designated 10, which has been modified to incorporate means to increase the charge on the bubble. Bubble generator 10 includes a bubble formula reservoir 12 which is, essentially, a rectangular housing having a partially open top at 14. Contained within reservoir 12 is a suitable liquid 16 which is used to make the bubbles. Reservoir 12 is partially enclosed at the top thereof by a cover 18 which supports a motor 20. Motor 20 includes a shaft 22 which rotatably supports a circular disc 24 which includes a plurality of holes 26. Disc 24 partially extends into opening 14 in reservoir 12 so as to be partially submerged within bubble formula 16. The remaining portion of bubble generator 10 is a blower 30 positioned within a blower housing 32. Blower housing 32 has a first side 34 which is positioned parallel to and spaced from disc 24. Side 34 has a plurality of holes 36 therein. Blower housing 32 has a second side 38 which has a single opening 40 therein. Finally, blower 30 is rotated by suitable drive means 42.

In operation, blower 30 is rotated by drive means 42 thereby drawing air or another gas through opening 40 in side 38 of housing 32 and sending a stream of gas through holes 36 in side 34. Simultaneously, motor 20 rotates disc 24 through bubble formula 16. As holes 26 in disc 24 emerge from reservoir 12, they are coated with bubble formula 16. The air or other gas coming through holes 36 passes through holes 26 in disc 24 blowing the bubbles.

According to the present invention, such a conventional bubble generator may be modified to substantially increase the charge on the resultant bubbles by adding a plate 44 which is supported by insulators 46 and 48 above cover 18 ans spaced from disc 24, on the opposite side of disc 24 from side 34 of blower housing 32. A source of DC voltage 50 has a first terminal connected to plate 44 and a second terminal connected via a slip ring assembly or other conventional means to disc 24. In this manner, a voltage potential is created between disc 24 and plate 44 thereby creating an electrostatic field therebetween. Because of the location of plate 44, the bubbles emerging from holes 26 in disc 24 pass into this field and are charged accordingly. The polarity of the charge can be adjusted by proper selection of the polarity of voltage supply 50.

It should be emphasized that bubble generator 10 is a well known machine for the production of bubbles to which a charging device has been added. Bubble generator 10 constitutes essentially a point source of bubbles. In other applications, line sources, surface sources or volume sources may be preferable. In these cases, available bubble generators may be modified in a similar manner so that the emergent bubbles pass through an electrostatic field upon generation to increase the charge thereon.

With these principles in mind, it is the basic teaching of the present invention that liquid or solid particles may be removed from a volume of gas in which they are suspended by generating a multiplicity of charged bubbles, the bubbles being substantially larger than the particles, introducing the charged bubbles into the volume of gas where the bubbles electrostatically attract the particles, and removing the bubbles with the particles from the gas by conventional means including permitting the bubbles with the particles to precipitate out of the volume of gas. In addition, in most embodiments which make use of this principle, it is important that the bubbles be individual bubbles rather than in the form of a foam.

According to a first embodiment of the present invention, the basic method, and the apparatus of the FIGURE, may be used to disperse fog. In general, fog consists of water droplets. Studies appear to indicate an essentially uniform droplet charge, e.g. predominantly negative. The droplets then tend to repel one another, and this effect may contribute to the stability of the fog.

Almost any disturbance of the air will cause coalescence of the water droplets which form the fog. Therefore, by introducing a multiplicity of bubbles into the fog, the bubbles having a diameter of 100 to 1,000 times the diameter of the fog droplets, and by placing a charge on the bubbles which is preferably opposite to the charge on the fog droplets, the fog droplets will be attracted to the bubbles. Because of the great difference in size between the bubbles and droplets, each bubble will be capable of attracting many fog droplets. As a large number of fog droplets adhere to the bubble, the entire mass becomes heavy and eventually precipitates out. Typically, after a large number of fog droplets have adhered to the bubble, the bubble and fog droplets coalesce forming a large droplet which precipitates out.

In a typical application, a curtain of bubbles is produced by known means such as that described previously. The bubbles are released upwind of the fog area to be cleared so that they drift with the wind into the fog area, sweeping up the fog droplets. The bubbles are preferably introduced in the form of individual bubbles. However, the bubbles may conceivably be introduced in the form of a foam. A suitable rise velocity or rate at which the bubbles will rise into the fog is controlled by selection of the nature and the temperature of the gas inside the bubbles. When making this selection, however, consideration must also be given to the fact that the gas will also influence the lifetime of the bubbles.

According to a second embodiment of the present invention, the basic method for the removal of liquid or solid particles from a volume of gas may be used to remove solid particles in the form of dust from the atmosphere. With respect to the collection of dust, it should be noted that the collection efficiency of a droplet of water is a function of the diameter of the dust particles sought to be collected. In other words, as the diameter of the particle increases, so does the collection efficiency of the water droplet. Conversely, very small particles, having a diameter of less than 2 microns, are the most difficult to remove from a volume of gas. Furthermore, it is these small particles which are the most harmful since they are the ones which most easily find their way into the lungs. Because of these factors, the presence of very small dust particles presents serious problems in many situations. One example would be in mines and especially coal mines where the air is highly contaminated with dust particles.

According to the present invention, a charged-bubble generator may be located in a coal mine and a liquid and gas selected for the bubbles that are completely safe to man. The bubbles may then be generated and introduced into the mine whereupon the particles will be attracted to the bubbles. It should also be noted that since the bubble is several orders of magnitude larger than the dust particle, each bubble will be effective in collecting a large number of particles. As the particles adhere to the bubble, the weight of the bubble increases until the bubble and particles simply drop to the ground.

According to a third embodiment of the present invention, the basic method for the removal of liquid or solid particles from a volume of gas may be utilized in a manner similar to conventional particle collection systems to remove liquid or solid particles from flowing gases in which they are suspended. For example, if it is desired to clean an effluent gas, such as that resulting from a combustion process, the gas may be passed through a suitable tank. In addition, means such as that described previously may be provided to introduce a multiplicity of charged, individual bubbles into the tank. For the reasons described above, the solid or liquid particles will be attracted by the charged bubbles and the bubbles and particles will drop out of the gas. Under such circumstances, the charged bubbles have a very high collection efficiency since their lightness causes them to float along with the gas thereby staying within the gas until they have collected a large number of particles.

According to a fourth embodiment of the present invention, the basic method for the removal of liquid or solid particles from a volume of gas may be used to remove the particles which often result during many chemical manufacturing processes. For example, in the manufacture of sulfuric acid, a mist of $H_2SO_4$ often forms above the body of water which the $SO_3$ is to be mixed with to form the acid. According to the present invention, this mist may be transferred to the bulk water by introducing a multiplicity of charged, individual bubbles into the $H_2SO_4$ mist. The liquid particles of $H_2SO_4$ adhere to the bubbles and eventually drop into the water solution. It should be noted that since a bubble contains less liquid than a water droplet, less contamination of the resultant sulfuric acid results using the present method than would result if water droplets were used to scavenge the $H_2SO_4$ particles.

It can, therefore, be seen that in accordance with the present invention there is described a method for the removal of liquid or solid particles from a volume of gas which is both practical and results in collection efficiencies which are much higher than that obtainable in the prior art. In addition, the present method is capable of several uses in which prior art collection removal techniques have been ineffective.

While the invention has been described with respect to several embodiments, it will be apparent to those skilled in the art that various modifications and improvements may be made without departing from the scope and spirit of the invention.

I claim:

1. A method for the removal of liquid or solid particles from a volume of gas comprising the steps of:
   generating a multiplicity of charged, individual bubbles, said bubbles being substantially larger than said particles;
   introducing said charged bubbles into said volume of gas whereby said bubbles electrostatically attract said particles; and
   permitting said bubbles with said particles to precipitate out of said volume of gas.

2. A method according to claim 1 wherein said bubbles are hollow, liquid bodies.

3. A method according to claim 1 wherein said bubbles are hollow, solid bodies.

4. A method according to claim 1 wherein said particles are dust particles.

5. A method according to claim 1 wherein said particles are fog droplets and wherein said volume of gas is the atmosphere.

6. A method for the dispersal of fog comprising the steps of:
   generating a multiplicity of charged bubbles, said bubbles being substantially larger than the fog droplets;
   dispersing said charged bubbles into said fog whereby said bubbles electrostatically attract said fog droplets; and
   permitting said bubbles with said fog droplets to coalesce and precipitate out of said fog.

7. A method according to claim 6 wherein the step of dispersing said charged bubbles into said fog comprises the step of:
   dispersing said bubbles into the atmosphere upwind of the area containing said fog whereby said bubbles drift with the wind into said fog.

8. A method according to claim 6 wherein the polarity of the charge on said bubbles is opposite to the polarity of the charge on said fog droplets.

9. A method for the dispersal of a liquid or solid particle mist during chemical manufacturing processes comprising the steps of:
   generating a multiplicity of charged, individual bubbles, said bubbles being substantially larger than the particles in said mist;
   introducing said charged bubbles into said mist whereby said bubbles electrostatically attract said particles; and
   permitting said bubbles with said particles to precipitate out of said mist.

10. A method for the removal of liquid or solid particles from a volume of gas comprising the steps of:
    passing said volume of gas through a chamber;
    introducing a multiplicity of charged, individual bubbles into said chamber, said bubbles floating along with said volume of gas and attracting said particles; and
    removing said bubbles with said particles from said volume of gas by conventional means.

11. Apparatus comprising:
    means for generating a multiplicity of bubbles; and
    means for substantially increasing the electrical charge on said bubbles that naturally occurs during generation thereof.

12. Apparatus according to claim 11 wherein said means for electrically charging said bubbles comprises:
    means for establishing an electrostatic field, said bubbles passing through said field.

13. Apparatus according to claim 11 wherein said means for substantially increasing the electrical charge on said bubbles is operative to increase, by several orders of magnitude, the electrical charge that naturally occurs during generation of said bubbles.

14. A method for the removal of liquid or solid particles from a volume of gas comprising the steps of:
    generating a multiplicity of charged, individual bubbles, said bubbles being substantially larger than said particles;
    introducing said charged bubbles into said volume of gas whereby said bubbles electrostatically attract said particles; and
    removing said bubbles with said particles from said volume of gas by conventional means.